United States Patent
Yang

(10) Patent No.: US 12,355,977 B2
(45) Date of Patent: Jul. 8, 2025

(54) DEVICE AND METHOD FOR DECODING VIDEO DATA

(71) Applicant: SHARP KABUSHIKI KAISHA, Sakai (JP)

(72) Inventor: Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 84 days.

(21) Appl. No.: 18/378,114

(22) Filed: Oct. 9, 2023

(65) Prior Publication Data

US 2024/0129480 A1  Apr. 18, 2024

Related U.S. Application Data

(60) Provisional application No. 63/415,215, filed on Oct. 11, 2022.

(51) Int. Cl.
*H04N 19/139*  (2014.01)
*H04N 19/105*  (2014.01)
*H04N 19/119*  (2014.01)
*H04N 19/157*  (2014.01)
*H04N 19/172*  (2014.01)
(Continued)

(52) U.S. Cl.
CPC ......... *H04N 19/139* (2014.11); *H04N 19/105* (2014.11); *H04N 19/119* (2014.11); *H04N 19/157* (2014.11); *H04N 19/172* (2014.11); *H04N 19/176* (2014.11); *H04N 19/196* (2014.11)

(58) Field of Classification Search
None
See application file for complete search history.

(56) References Cited

U.S. PATENT DOCUMENTS

2022/0150542 A1*  5/2022  Yoo ..................... H04N 11/046
2022/0201306 A1*  6/2022  Kato .................... H04N 19/18
(Continued)

OTHER PUBLICATIONS

Series H: Audiovisual and Multimedia Systems Infrastructure of audiovisual services—Coding of moving video, Recommendation ITU-T H.266(Apr. 2022), Versatile video coding.
(Continued)

*Primary Examiner* — Talha M Nawaz
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method further determines a plurality of neighboring sub-partitions selected from a plurality of neighboring sub-blocks and determines, from the current frame, more than one previously affine-coded block reconstructed in an affine-based mode prior to reconstructing the block unit. The method receives a plurality of neighboring motion vectors of the neighboring sub-partitions and a plurality of affine motion vectors of the affine-coded sub-blocks and derives a motion linear model based on the neighboring motion vectors and the neighboring positions of the neighboring sub-partitions and the affine motion vectors and the affine positions of the affine-coded sub-blocks. Then,
(Continued)

the method determines a plurality of derived motion vectors based on the motion linear model for reconstructing the block unit.

18 Claims, 7 Drawing Sheets

(51) Int. Cl.
*H04N 19/176* (2014.01)
*H04N 19/196* (2014.01)

(56) References Cited

U.S. PATENT DOCUMENTS

2022/0210403 A1* 6/2022 Paluri ............... H04N 19/30
2022/0217404 A1* 7/2022 Paluri ............... H04N 19/70

OTHER PUBLICATIONS

Muhammed Coban et al., "Algorithm description of Enhanced Compression Model 5 (ECM 5)", Joint Video Experts Team (JVET) of ITU-T SG 16 WP 3 and ISO/IEC JTC 1/SC 29, 26th Meeting, by teleconference, Apr. 20-29, 2022, [JVET-Z2025-v1].

Adrian Browne et al., "Algorithm description for Versatile Video Coding and Test Model", Joint Video Experts Team (JVET) of ITU-T SG 16 WP 3 and ISO/IEC JTC 1/SC 29, 26th Meeting, by teleconference, Apr. 20-29, 2022, [JVET-Z2002-v2].

Jianle Chen et al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, Oct. 7-16, 2020, [JVET-T2002-v2].

Wei Chen et al., "EE2-2.7, 2.8, 2.9: History-parameter-based affine model inheritance and Non-adjacent affine mode", Joint Video Experts Team (JVET) of ITU-T SG 16 WP 3 and ISO/IEC JTC 1/SC 29, 26th Meeting, by teleconference, Apr. 20-29, 2022, [JVET-Z0139-v1].

Benjamin Bross et al., "Versatile Video Coding Editorial Refinements on Draft 10", Joint Video Experts Team (JVET) of ITU-T SG 16 WP 3 and ISO/IEC JTC 1/SC 29, 20th Meeting, by teleconference, Oct. 7-16, 2020, [JVET-T2001-v2].

Benjamin Bross et al., "Versatile Video Coding (Draft 10)", Joint Video Experts Team (JVET) of ITU-T SG 16 WP 3 and ISO/IEC JTC 1/SC 29/WG 11, 19th Meeting: by teleconference, Jun. 22-Jul. 1, 2020, [JVET-S2001-vG].

\* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/415,215, filed on Oct. 11, 2022, entitled "Modifications on Adaptive Blending Width Adjustment," the content of which is hereby incorporated herein fully by reference in its entirety.

FIELD

The present disclosure is generally related to video coding and, more specifically, to techniques for deriving a motion linear module based on several reference motion vectors.

BACKGROUND

Regression-based motion vector field (RMVF) mode is a new coding tool for a video coding method, in which an encoder and a decoder may determine several reference motion vectors and several reference positions of several reference sub-blocks and may determine a motion linear module for predicting and reconstructing a block unit based on the reference motion vectors and the reference positions of the reference sub-blocks.

When the encoder and the decoder reconstruct the block unit in the RMVF mode, the motion linear module is derived for generating several motion vectors of the block unit. However, the current selection method for selecting the reference sub-blocks may not be inadequate to predict all of the block units in the video. Therefore, a new selection method may be required for the encoder and the decoder to be able to precisely and efficiently predict and/or reconstruct the block unit.

SUMMARY

The present disclosure is directed to a device and method for deriving a motion linear module based on several reference motion vectors.

In a first aspect of the present disclosure, a method of decoding video data and an electronic device for performing the method are provided. The method includes receiving the video data; determining a block unit from a current frame included in the video data; determining multiple neighboring sub-partitions selected from multiple neighboring sub-blocks, wherein: the multiple neighboring sub-blocks is included in multiple neighboring blocks spatially neighboring the block unit and reconstructed prior to reconstructing the block unit, and each of the multiple neighboring sub-partitions is located at a neighboring position; determining, from the current frame, more than one previously affine-coded block reconstructed in an affine-based mode prior to reconstructing the block unit, wherein: each of the more than one previously affine-coded block includes multiple affine-coded sub-blocks, each of the multiple affine-coded sub-blocks is located at an affine position, and the multiple affine-coded sub-blocks is different from the multiple neighboring sub-partitions; receiving multiple neighboring motion vectors of the multiple neighboring sub-partitions and multiple affine motion vectors of the multiple affine-coded sub-blocks; deriving a motion linear model based on the multiple neighboring motion vectors and the multiple neighboring positions of the multiple neighboring sub-partitions and the multiple affine motion vectors and the multiple affine positions of the multiple affine-coded sub-blocks; and determining multiple derived motion vectors for the block unit based on the motion linear model for reconstructing the block unit.

In an implementation of the first aspect, the motion linear model is derived using a regression-based motion vector field (RMVF) derivation.

In an implementation of the first aspect, multiple model parameters is derived by using the multiple neighboring motion vectors and the multiple neighboring positions of the multiple neighboring sub-partitions and the multiple affine motion vectors and the multiple affine positions of the multiple affine-coded sub-blocks to solve the motion linear model in an error function.

In an implementation of the first aspect, the error function is a mean square error (MSE) function.

In an implementation of the first aspect, each of the multiple neighboring sub-blocks in a specific one of the multiple neighboring blocks is determined as one of the multiple affine-coded sub-blocks when the specific one of the multiple neighboring blocks is reconstructed in the affine-based mode, and one or more of the multiple neighboring sub-blocks in the specific one of the multiple neighboring blocks are determined as the multiple neighboring sub-partitions and the others of the multiple neighboring sub-blocks in the specific one of the multiple neighboring blocks are excluded from the multiple neighboring sub-partitions when the specific one of the multiple neighboring blocks is reconstructed in a first prediction mode different from the affine-based mode.

In an implementation of the first aspect, each of the one or more of the multiple neighboring sub-blocks is adjacent to the block unit, and neighboring sub-blocks other than the one or more of the multiple neighboring sub-blocks are separated from the block unit by the one or more of the multiple neighboring sub-blocks.

An implementation of the first aspect further includes dividing the block unit into multiple sub-block units; determining multiple sub-block positions of the multiple sub-block units; deriving one of the multiple derived motion vectors for each of the multiple sub-block units by applying a corresponding one of the multiple sub-block positions to the motion linear model; and reconstructing each of the sub-block units based on a corresponding one of the multiple derived motion vectors to reconstruct the block unit.

An implementation of the first aspect further includes determining at least one of multiple control point (CP) positions of the block unit in the affine-based mode; determining at least one CP motion vector in the affine-based mode by applying the at least one of the multiple CP positions to the motion linear model to generate at least one of multiple affine candidates; and reconstructing the block unit based on the at least one of the multiple affine candidates.

In an implementation of the first aspect, a sum of a number of the multiple neighboring sub-partitions and a number of the multiple affine-coded sub-blocks for deriving the motion linear model is less than or equal to a quantity threshold.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
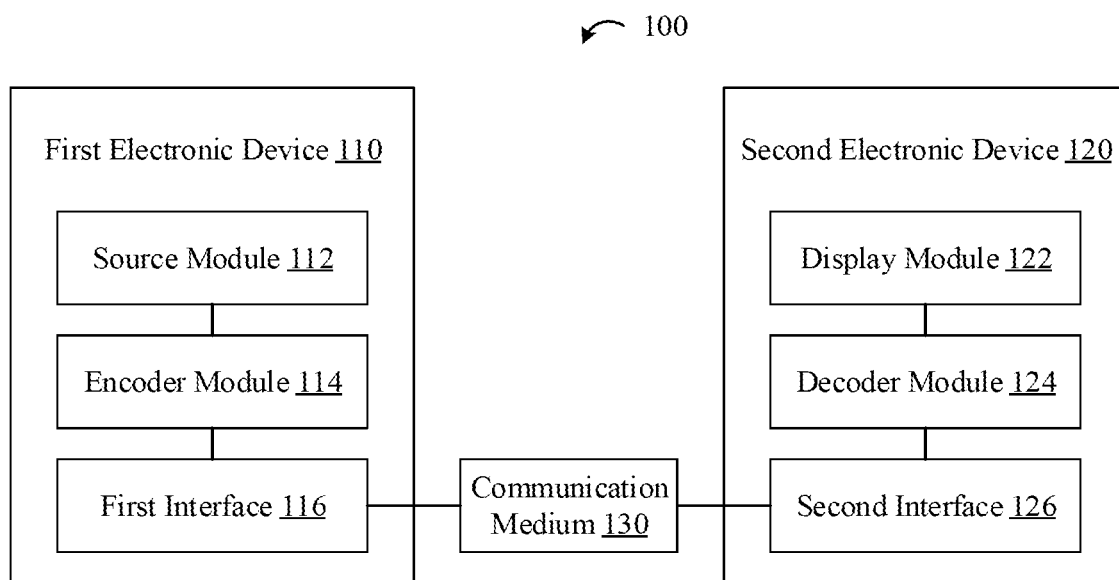
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the computer-executable instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light emitting diode (OLED) display technology, or light-emitting polymer display (LPD) technology, with other display technologies used in other implementations. The display module 122 may include a high-definition display or an ultra-high-definition display.

Figure 2:
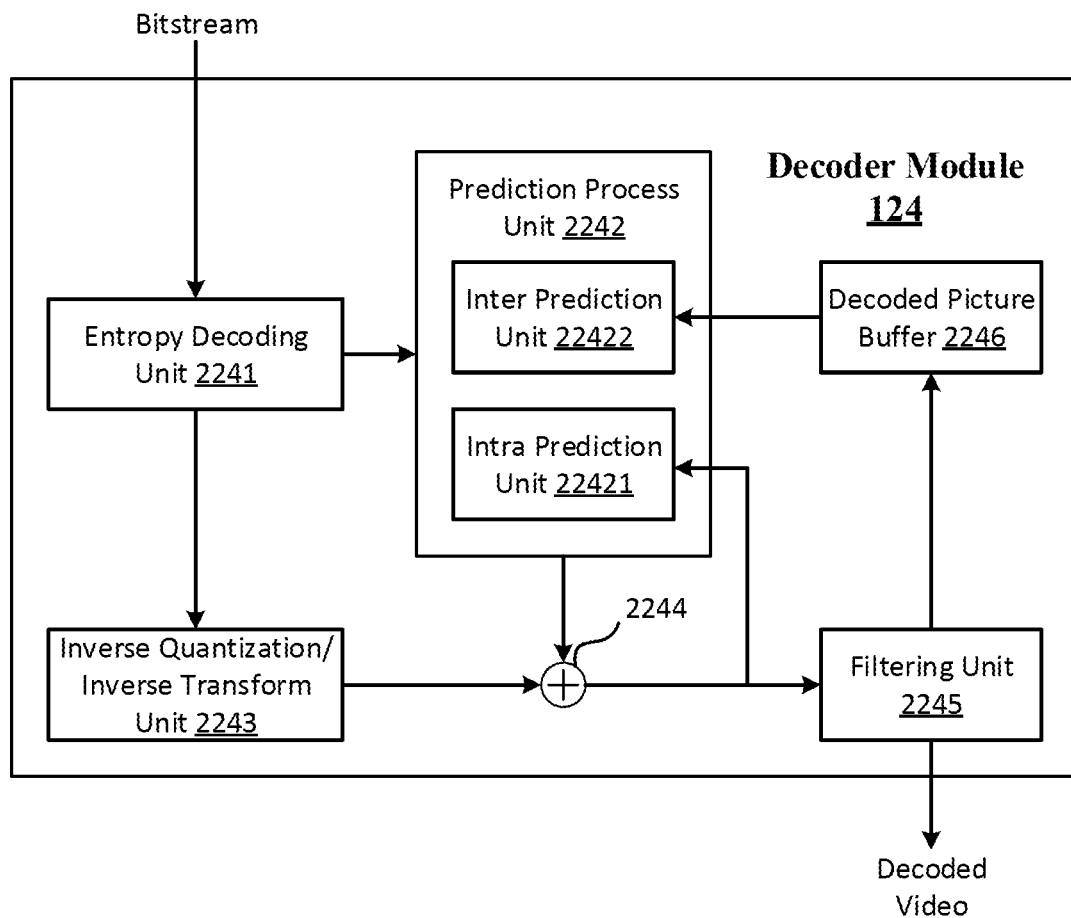
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including a plurality of syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements, such as motion vectors, intra modes, partition information, and other syntax information, from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or other equivalent coding units.

During the decoding process, the prediction process unit 2242 may receive predicted data including the intra mode or the motion vector for a current block unit in a current image block of a specific one of the image frames. The current image block may include at least one of a current luminance block (e.g., a Y block) and current chrominance blocks (e.g., a Cb block and a Cr block) in the specific image frame. When the predicted data is received for the current luminance block, the current luminance block may be regarded as the current block unit. When the predicted data is received for one of the at least one current chrominance block, the one of the at least one current chrominance block may be regarded as the current block unit.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the plurality of chroma components is reconstructed by the prediction process unit 2242.

The intra prediction unit 22421 may reconstruct a plurality of chroma components of the current block unit based on the plurality of luma components of the current block unit when the plurality of luma components of the current block unit is reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as discrete cosine transform (DCT), discrete sine transform (DST), adaptive multiple transform (AMT), mode-dependent non-separable secondary transform (MDNSST), Hypercube-Givens transform (HyGT), signal-dependent transform, Karhunen-Loéve transform (KLT), wavelet transform, integer transform, sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
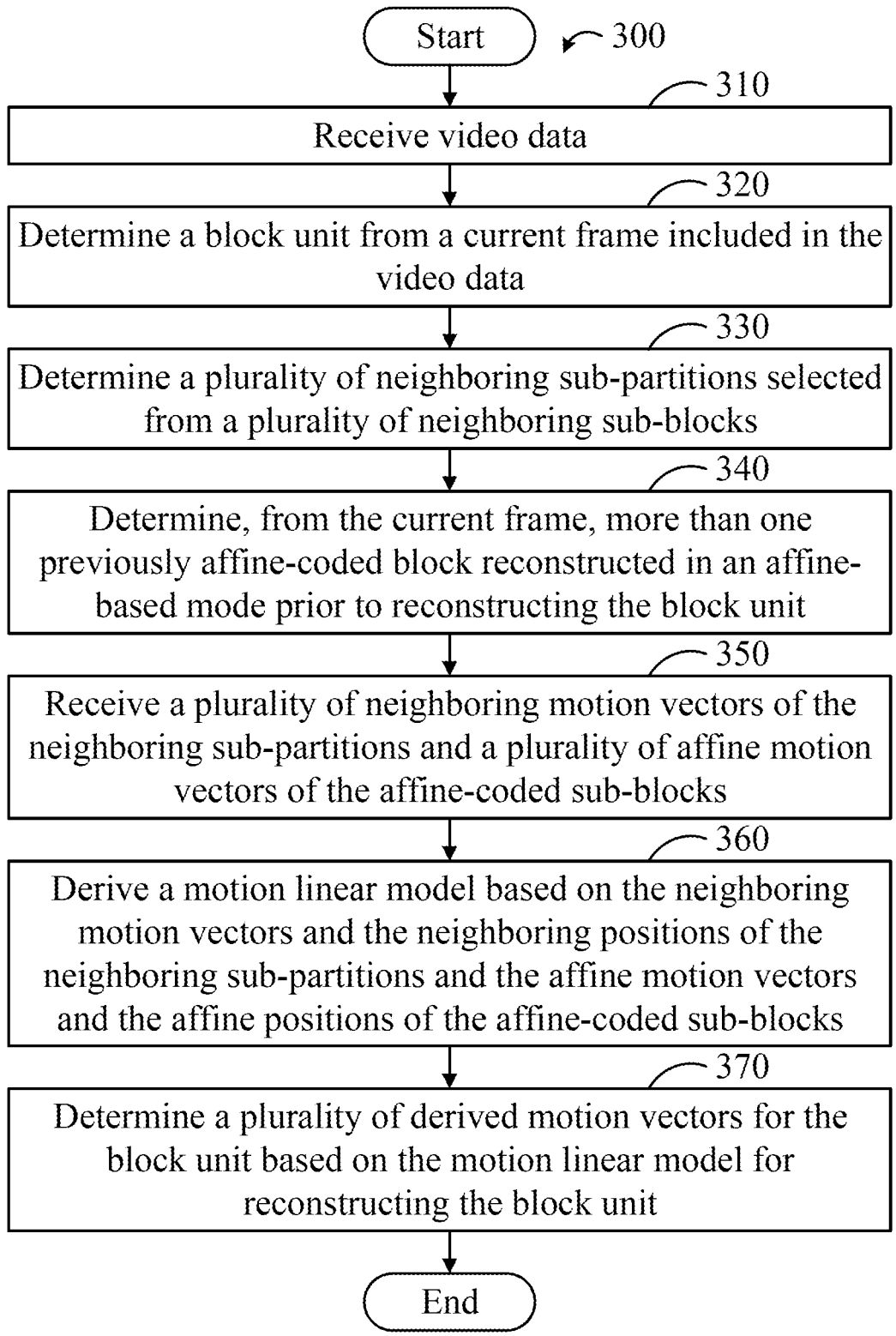
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there is a variety of different methods to decode the video data.

The method/process 300 may be performed by an electronic device using the configurations illustrated in FIGS. 1 and 2, and, as such, various elements of these figures are referenced with the description of the method/process 300. Each block illustrated in FIG. 3 may represent one or more processes, methods, or subroutines performed by an electronic device.

The order in which the blocks appear in FIG. 3 is for illustration only, and may not be intended to limit the scope of the present disclosure, thus may change in different implementations. Additional blocks may be added or fewer blocks may be utilized without departing from the present disclosure.

At block 310, the method/process 300 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined from the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications using a video coding standard. The size of the block unit may be Wb×Hb. In some implementations, the values Wb and Hb may be positive integers (e.g., 4, 8, etc.) that may be equal to, or different from, each other.

At block 330, the decoder module 124 may determine a plurality of neighboring sub-partitions selected from a plurality of neighboring sub-blocks.

With reference to FIGS. 1 and 2, the decoder module 124 may determine a plurality of neighboring blocks spatially neighboring the block unit and reconstructed prior to the reconstruction of the block unit. Both the neighboring blocks and the block unit may be included in the current frame. Each of the neighboring blocks may further include a plurality of neighboring sub-blocks. Each of the neighboring sub-blocks may have the same size and the same shape. The shape of the neighboring sub-blocks may be a rectangle or a square. The size of the neighboring sub-blocks may be Wnsb×Hnsb. In some implementations, the values Wnsb and Hnsb may be positive integers (e.g., 4, 8, etc.) that may be equal to, or different from, each other. For example, each of the neighboring sub-blocks may be a 4×4 sub-block.

The neighboring sub-partitions may be selected from the neighboring sub-blocks. The neighboring sub-blocks included in a neighboring region may be selected as the neighboring sub-partitions, and the other neighboring sub-blocks excluded from the neighboring region may be excluded from the neighboring sub-partitions. The neighboring region may include a plurality of neighboring sub-regions. A first neighboring sub-region may be a top neighboring sub-region located above the block unit, a second neighboring sub-region may be a left neighboring sub-region located at a left side of the block unit, and a third neighboring sub-region may be a top-left neighboring sub-region located at a top-left side of the block unit. In addition, a fourth neighboring sub-region may be a top-right neighboring sub-region located at a top-right side of the block unit, and a fifth neighboring sub-region may be a bottom-left neighboring sub-region located at a bottom-left side of the block unit.

A height of the top-left neighboring sub-region and a height of the top-right neighboring sub-region may be equal to a height Hra (being a positive integer) of the top neighboring sub-region. In some implementations, the height Hra of the top neighboring sub-region, the top-left neighboring sub-region, and the top-right neighboring sub-region may be equal to the value Hnsb. In other words, the top neighboring sub-region, the top-left neighboring sub-region, and the top-right neighboring sub-region may include only one row of the neighboring sub-blocks included in the neighboring blocks. The one row of the neighboring sub-blocks may be adjacent the block unit and selected as the neighboring sub-partitions. A width Wra (being a positive integer) of the top neighboring sub-region may be equal to the width Wb of the block unit, a width Wral (being a positive integer) of the top-left neighboring sub-region may be determined based on the width Wb of the block unit, and a width Wrar (being a positive integer) of the top-right neighboring sub-region may also be determined based on the width Wb of the block unit. In some implementations, the width Wral may be equal to a half of the width Wb of the block unit, and the width Wral may also be equal to a half of the width Wb of the block unit.

A width of the bottom-left neighboring sub-region may be equal to a width Wrl (being a positive integer) of the left neighboring sub-region. In some implementations, the width Wrl of the left neighboring sub-region and the bottom-left neighboring sub-region may be equal to the value Wnsb. In other words, the left neighboring sub-region and the bottom-left neighboring sub-region may include only one column of the neighboring sub-blocks included in the neighboring blocks. The one column of the neighboring sub-blocks may be adjacent the block unit and selected as the neighboring sub-partitions. A height Hrl (being a positive integer) of the left neighboring sub-region may be equal to the height Hb of the block unit, and a height Hrbl (being a positive integer) of the bottom-left neighboring sub-region may be determined based on the height Hb of the block unit. In some implementations, the height Hrbl may be equal to a half of the height Hb of the block unit.

Figure 4:
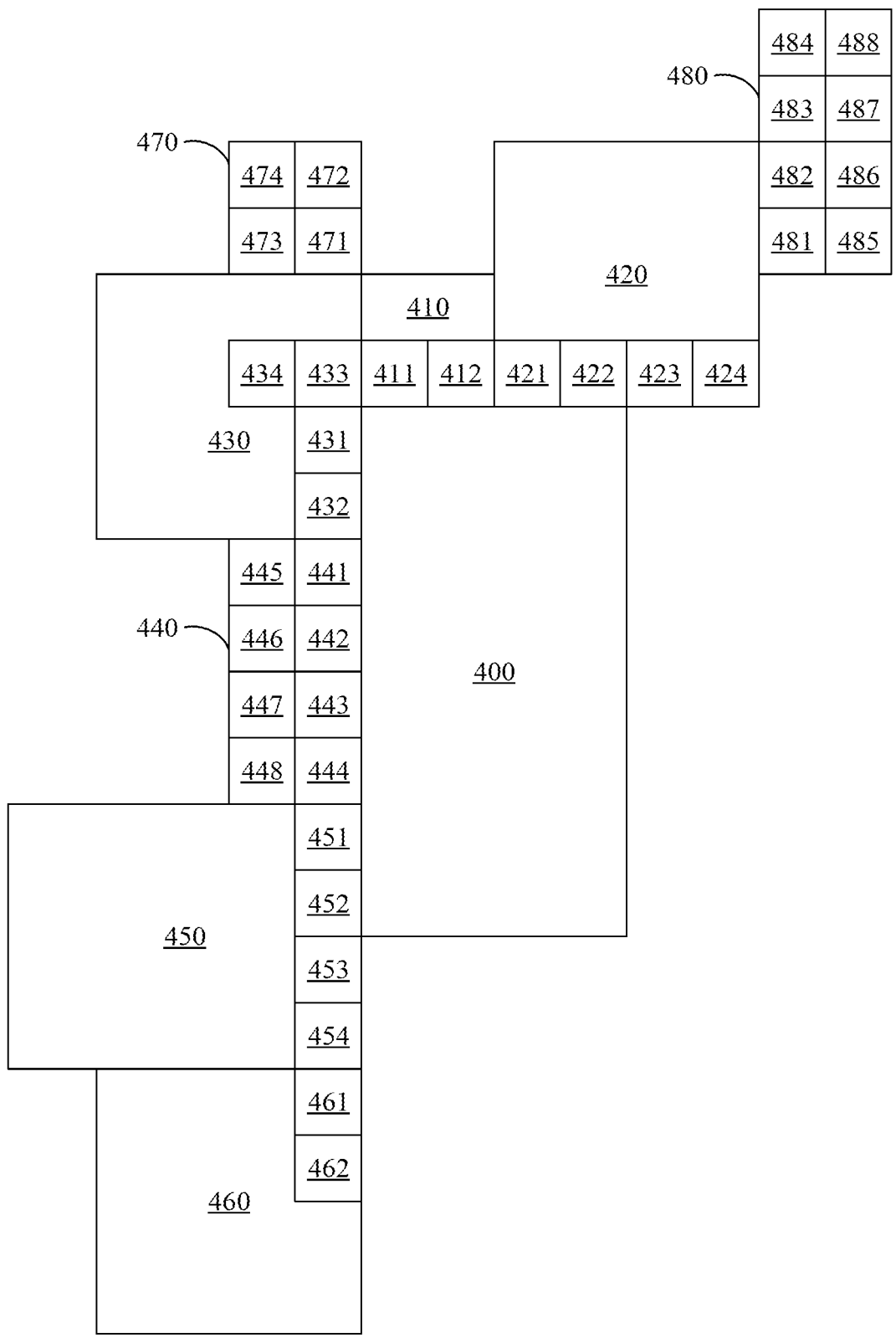
FIG. 4 illustrates an example implementation of a block unit and a plurality of reconstructed blocks, in accordance with one or more example implementations of this disclosure.

FIG. 4 illustrates an example implementation of a block unit 400 and a plurality of reconstructed blocks 410-480, in accordance with one or more example implementations of this disclosure. The reconstructed blocks 410-480 may be reconstructed prior to the reconstruction of the block unit 400. The reconstructed blocks 410-460 may be the neighboring blocks neighboring the block unit 400 and include a plurality of neighboring sub-blocks. The neighboring sub-partitions included in the neighboring region may be selected from the neighboring sub-blocks. The neighboring sub-partitions in the top neighboring sub-region may include the neighboring sub-blocks 411, 412, 421, and 422. The neighboring sub-partitions in the top-right neighboring sub-region may include the neighboring sub-blocks 423 and 424. The neighboring sub-partitions in the top-left neighboring sub-region may include the neighboring sub-blocks 433 and 434. The neighboring sub-partitions in the left neighboring sub-region may include the neighboring sub-blocks 431, 432, 441-444, 451, and 452. The neighboring sub-partitions in the bottom-left neighboring sub-region may include the neighboring sub-blocks 453, 454, 461, and 462. The one row of the neighboring sub-blocks 411, 412, 421-424, 433, and 434 may be adjacent the block unit 400 and selected as the neighboring sub-partitions. The one column of the neighboring sub-blocks 431, 432, 441-444, 451-454, 461 and 462 may be adjacent the block unit 400 and selected as the neighboring sub-partitions.

Referring back to FIG. 3, at block 340, the decoder module 124 may determine, from the current frame, more than one previously affine-coded block reconstructed in an affine-based mode prior to the reconstruction of the block unit.

With reference to FIGS. 1 and 2, the decoder module 124 may determine a plurality of reconstructed blocks from the current frame. Before reconstructing the block unit, the reconstructed blocks may have been reconstructed. The decoder module 124 may check a plurality of prediction modes of the reconstructed blocks. The prediction modes may include an intra-based prediction mode and an inter-based prediction mode including a regular inter prediction mode, an inter-merge mode, an affine-based mode, and other inter prediction modes. When a specific one of the reconstructed blocks is reconstructed in the affine-based mode, the specific reconstructed block may be set as one of a plurality of affine-coded blocks. The decoder module 124 may select more than one previously affine-coded block from the affine-coded blocks. For example, the decoder module 124 may select the most recent N of the affine-coded blocks as the more than one previously affine-coded block when the block unit is being reconstructed. In some implementations, the number N may be a positive integer greater than one. Each of the more than one previously affine-coded block may include a plurality of affine-coded sub-blocks.

In some implementations, with reference to FIG. 4, the decoder module 124 may determine the reconstructed blocks 410-480 and any other reconstructed blocks (not shown in FIG. 4) from the current frame when the block unit is being reconstructed. The decoder module 124 may determine, from the reconstructed blocks, the affine-coded blocks reconstructed in the affine-based mode. For example, the reconstructed blocks 440, 470, and 480 may be reconstructed in the affine-based mode and set as the affine-coded blocks. In some implementations, the affine-coded blocks may include the reconstructed blocks 440, 470, and 480, and any other reconstructed blocks reconstructed in the affine-based mode in the current frame.

In some implementations, when the number N is equal to two, the more than one previously affine-coded block may include two of the reconstructed blocks 440, 470, and 480. In some implementations, when the number N is equal to two, the more than one previously affine-coded block may include one of the reconstructed blocks 440, 470, and 480 and one of the other reconstructed blocks reconstructed in the affine-based mode in the current frame. For example, the one of the other reconstructed blocks reconstructed in the affine-based mode in the current frame may be a reconstructed block adjacent the reconstructed block 440. In some implementations, when the number N is equal to three, the more than one previously affine-coded block may include the reconstructed blocks 440, 470, and 480. In some implementations, when the number N is equal to three, the more than one previously affine-coded block may include two of the reconstructed blocks 440, 470, and 480 and one of the other reconstructed blocks reconstructed in the affine-based mode in the current frame. In some implementations, when the number N is equal to three, the more than one previously affine-coded block may include one of the reconstructed blocks 440, 470, and 480 and two of the other reconstructed blocks reconstructed in the affine-based mode in the current frame. The more than one previously affine-coded block may be selected based on a decoding order of the affine-coded blocks.

In some implementations, each of the more than one previously affine-coded block may include a plurality of affine-coded sub-blocks. When the reconstructed block 470 is one of the more than one previously affine-coded block, the reconstructed block 470 may include a plurality of affine-coded sub-blocks 471-474. When the reconstructed block 480 is one of the more than one previously affine-coded block, the reconstructed block 480 may include a plurality of affine-coded sub-blocks 481-488. When the reconstructed block 440 is one of the more than one previously affine-coded block, the neighboring sub-blocks 445-448 of the reconstructed block 440 may be included in the affine-coded sub-blocks. However, the neighboring sub-blocks 441-444 in the neighboring block 440 may be excluded from the affine-coded sub-blocks when the neighboring sub-partitions are selected before selecting the affine-coded sub-blocks, since the neighboring sub-blocks 441-444 may have been set as the neighboring sub-partitions. In some implementations, the neighboring sub-blocks 441-448 may be generated by dividing the reconstruct block 440. In some implementations, the affine-coded sub-blocks may be different from the neighboring sub-partitions.

In some implementations, block 330 may be performed before performing block 340, for example, when the neighboring sub-partitions are selected before selecting the affine-coded sub-blocks. Conversely, block 340 may be performed before performing block 330, for example, when the affine-coded sub-blocks are selected before selecting the neighboring sub-partitions. In some implementations, each of the neighboring sub-blocks in a specific one of the neighboring blocks may be determined as one of the affine-coded sub-blocks when the specific neighboring block is reconstructed in the affine-based mode. For example, when the neighboring block 440 is one of the more than one previously affine-coded block reconstructed in the affine-based mode, all of the neighboring sub-blocks 441-448 in the neighboring block 440 may be determined as the affine-coded sub-blocks. Thus, the neighboring sub-blocks 441-444 in the neighboring block 440 may be determined as the affine-coded sub-blocks and may be excluded from the neighboring sub-partitions when the affine-coded sub-blocks are selected before selecting the neighboring sub-partitions.

In some implementations, one or more of the neighboring sub-blocks in the specific neighboring block may be determined as the neighboring sub-partitions and the remaining neighboring sub-blocks in the specific neighboring block may be excluded from the neighboring sub-partitions, for example, when the specific neighboring block is reconstructed in a first prediction mode different from the affine-based mode. In some implementations, each of the one or more of the neighboring sub-blocks may be adjacent the block unit, and the remaining neighboring sub-blocks (e.g., other than the one or more of the neighboring sub-blocks) may be non-adjacent the block unit. For example, when the first prediction mode of the neighboring block 440 is different from the affine-based mode, the neighboring sub-blocks 441-444 in the neighboring block 440 that are adjacent to the block unit 400 may be determined as the neighboring sub-partitions. In addition, the neighboring sub-blocks 445-448 in the neighboring block 440 may be separated from the block unit 400 by the neighboring sub-blocks 441-444 and may be excluded from the neighboring sub-partitions. In some implementations, the first prediction mode may be one of the inter-based prediction modes and may be different from the affine-based mode.

Referring back to FIG. 3, at block 350, the decoder module 124 may receive a plurality of neighboring motion vectors of the neighboring sub-partitions and a plurality of affine motion vectors of the affine-coded sub-blocks.

With reference to FIGS. 1 and 2, the decoder module 124 may determine the prediction modes of the neighboring blocks and the more than one previously affine-coded blocks. Since the neighboring blocks and the more than one previously affine-coded blocks have been reconstructed prior to the reconstruction of the block unit, the decoder module 124 may directly receive the prediction modes of the neighboring blocks and the more than one previously affine-coded blocks when the block unit is being reconstructed.

When a specific one of the neighboring blocks is reconstructed in the inter-based prediction mode, the specific neighboring block may be reconstructed based on at least one neighboring prediction vector. Thus, the decoder module 124 may directly receive the neighboring motion vector for each of the neighboring sub-partitions included in the specific neighboring block. When the specific neighboring block is reconstructed in the intra-based prediction mode, there may be no neighboring prediction vector for the specific neighboring block. Thus, there may be no neighboring motion vector for the neighboring sub-partitions included in the specific neighboring block.

The neighboring motion vectors of the neighboring sub-partitions included in the specific neighboring block may be determined based on the at least one neighboring prediction vector of the specific neighboring block. In some implementations, after the specific neighboring block has been reconstructed in the inter-based prediction mode based on the at least one neighboring prediction vector, the decoder module 124 may divide the specific neighboring block into the neighboring sub-blocks of the specific neighboring block. Then, the decoder module 124 may store motion information for each of the neighboring sub-blocks in the specific neighboring block. The stored motion information of the neighboring sub-blocks in the specific neighboring block may be temporarily stored in a motion field of a table, a buffer, or any other physical devices or a software-based storage system.

In some implementations, each of the stored motion information of the neighboring sub-blocks may be used to store a motion vector and a reference frame for a corresponding one of the neighboring sub-blocks. In some implementations, the stored motion information of the neighboring sub-blocks in the specific neighboring block may be different from, or identical to, each other. As such, the neighboring motion vectors of the neighboring sub-partitions included in the specific neighboring block may also be identical to, or different from, each other. In some implementations, one of the neighboring motion vectors stored for one of the neighboring sub-partitions included in the specific neighboring block may be identical to one of the at least one neighboring prediction vector of the specific neighboring block. In some implementations, one of the neighboring motion vectors stored for one of the neighboring sub-partitions included in the specific neighboring block may be different from each of the at least one neighboring prediction vector of the specific neighboring block.

Since the affine-based mode may be one kind of the prediction modes included in the inter-based prediction mode, each of the affine-coded blocks may also be reconstructed based on a plurality of affine prediction vectors. Thus, the decoder module 124 may directly receive the affine motion vector for each of the affine-coded sub-blocks included in the more than one previously affine-coded block. The affine motion vectors of the affine-coded sub-blocks included in a specific one of the affine-coded blocks may be determined based on the affine prediction vectors of the specific affine-coded block. In some implementations, after the specific affine-coded block has been reconstructed in the affine-coded mode based on the affine prediction vectors of the specific affine-coded block, the decoder module 124 may divide the specific affine-coded block into the affine-coded sub-blocks of the specific affine-coded block. Then, the decoder module 124 may store motion information for each of the affine-coded sub-blocks in the specific affine-coded block. The stored motion information of the affine-coded sub-blocks in the specific affine-coded block may be temporarily stored in a motion field of a table, a buffer, or any other physical device or a software-based storage system.

In some implementations, the stored motion information of the affine-coded sub-blocks in the specific affine-coded block may be different from, or identical to, each other. As such, the affine motion vectors of the affine-coded sub-blocks included in the specific affine-coded block may be identical to, or different from, each other. In some implementations, one of the affine motion vectors stored for one of the affine-coded sub-blocks included in the specific affine-coded block may be identical to one of the affine prediction vectors of the specific affine-coded block. In some implementations, one of the affine motion vectors stored for one of the affine-coded sub-blocks included in the specific affine-coded block may be different from each of the affine prediction vectors of the specific affine-coded block.

In some implementations, a sum of a number of the neighboring sub-partitions having the neighboring motion vectors and a number of the affine-coded sub-blocks for deriving a motion linear model may be less than or equal to a quantity threshold. In some implementations, the quantity threshold may be a positive integer. For example, the quantity threshold may be equal to 255. For example, when the affine motion vectors are received before receiving the neighboring motion vectors and the number of the affine-coded sub-blocks is greater than or equal to the quantity threshold, the motion linear model may be derived by only using the affine-coded sub-blocks. In addition, when the affine motion vectors are received before receiving the neighboring motion vectors and the number of the affine-coded sub-blocks is less than the quantity threshold, the motion linear model may be derived by using the affine-coded sub-blocks and the neighboring sub-partitions. In some implementations, when the neighboring motion vectors are received before receiving the affine motion vectors and the number of the neighboring sub-partitions having the neighboring motion vectors is less than the quantity threshold, the motion linear model may be derived by using the affine-coded sub-blocks and the neighboring sub-partitions.

Referring back to FIG. 3, at block 360, the decoder module 124 may derive a motion linear model based on the neighboring motion vectors and the neighboring positions of the neighboring sub-partitions and the affine motion vectors and the affine positions of the affine-coded sub-blocks.

With reference to FIGS. 1 and 2, the decoder module 124 may use the neighboring motion vectors and the neighboring positions determined from the neighboring blocks and the affine motion vectors and the affine positions determined from the more than one previously affine-coded block to derive the motion linear model of the block unit for predicting the block unit. In some implementations, the motion linear model may be derived by a regression-based motion vector field (RMVF) derivation. In some implementations, the motion linear model may be a 6-parameter motion linear model. In some implementations, the motion linear model may be determined, as follows:

$$\begin{bmatrix} MV_{x\_subPU} \\ MV_{y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix}$$

In some implementations, the matrix $$\begin{bmatrix} MV_{x\_subPU} \\ MV_{y\_subPU} \end{bmatrix}$$

may show a linear motion vector ($MV_{x\_subPU}$, $MV_{y\_subPU}$) of a sub-prediction unit (sub-PU) located at a sub-PU position ($X_{subPU}$, $Y_{subPU}$) A plurality of model parameters $a_{xx}$, $a_{xy}$, $a_{yx}$, $a_{yy}$, $b_x$ and $b_y$ may be derived by using the neighboring motion vectors and the neighboring positions of the neighboring sub-partitions and the affine motion vectors and the affine positions of the affine-coded sub-blocks to solve the motion linear model in an error function. In some implementations, the error function may be a mean square error (MSE) function.

In some implementations, each of the neighboring positions may be represented by neighboring coordinates ($X_n$, $Y_n$), and each of the neighboring motion vectors may be represented by a motion vector ($MV_{x\_n}$, $MV_{y\_n}$). In addition, each of the affine positions may be represented by affine coordinates ($X_a$, $Y_a$), and each of the affine motion vectors may be represented by a motion vector ($MV_{x\_a}$, $MV_{y\_a}$). In some implementations, a position of original coordinates (0, 0) may be predefined for the block unit to determine the neighboring coordinates ($X_n$, $Y_n$) and the affine coordinates ($X_a$, $Y_a$). For example, a position of a top-left sample of the block unit may be predefined as the position of the original coordinates (0, 0). Thus, the affine coordinates ($X_a$, $Y_a$) may specify a top-left sample of the affined-coded sub-block relative to the top-left sample of the block unit, and the neighboring coordinates ($X_n$, $Y_n$) may specify a top-left sample of the neighboring sub-partition relative to the top-left sample of the block unit. In some implementations, a plurality of affine information between the affine coordinates $(X_a, Y_a)$ and the motion vectors $(MV_{x\_a}, MV_{y\_a})$ and a plurality of neighboring information between the neighboring coordinates $(X_n, Y_n)$ and the motion vectors $(MV_{x\_n}, MV_{y\_n})$ may be used to derive the six model parameters $a_{xx}$, $a_{xy}$, $a_{yx}$, $a_{yy}$, $b_x$ and $b_y$.

At block 370, the decoder module 124 may determine a plurality of derived motion vectors for the block unit based on the motion linear model for reconstructing the block unit.

With reference to FIGS. 1 and 2, the decoder module 124 may divide the block unit into a plurality of sub-block units and determine a sub-block position for each of the sub-block units. Each of the sub-block positions may be represented by sub-block coordinates $(X_{subb}, Y_{subb})$ determined based on the predefined position of the original coordinates (0, 0). In some implementations, the sub-block coordinates $(X_{subb}, Y_{subb})$ may specify a top-left sample of a sub-block unit relative to the top-left sample of the block unit.

A specific one of the derived motion vectors of the block unit may be derived for a specific one of the sub-block units by applying a corresponding one of the sub-block positions to the motion linear model. Then, the decoder module 124 may reconstruct each of the sub-block units based on a corresponding one of the derived motion vectors to reconstruct the block unit. In some implementations, a specific one of the sub-block positions may be used to derive a corresponding one of the derived motion vector. As such, the corresponding one of the derived motion vectors may be used to predict one of the sub-block units located at the specific sub-block position.

In addition, each of the sub-block units may have the same reference frame, and as such, the decoder module 124 may use the derived motion vectors and the reference frame to predict the sub-block units and generate a plurality of predicted sub-blocks. In some implementations, the reference frame of the block unit may be determined based on the reference frames stored in the stored motion information of the neighboring sub-partitions and the affine-coded sub-partitions. In some implementations, the reference frame of the block unit may be determined based on the reference frames stored in the stored motion information of the affine-coded sub-partitions. In some implementations, the reference frame of the block unit may be identical to the reference frame stored in the stored motion information of the most recent one of the affine-coded sub-partitions. In other words, in some implementations, the reference frame of the block unit may be identical to the reference frame of the most recent one of the affine-coded blocks. In some implementations, the most recent one of the affine-coded blocks relative to the block may be determined based on a predefined search pattern included in both encoder and decode. In some implementations, the search pattern may include a plurality of predefined positions, and the predefined positions may include adjacent spatial positions and/or non-adjacent spatial positions used in the inter-merge mode. In some implementations, the decoder module 124 may combine the predicted sub-blocks to generate a predicted block.

In some implementations, when the block unit is reconstructed in the affine-coded mode, the decoder module 114 may determine at least one of a plurality of control point (CP) positions of the block unit in the affine-based mode, and determine at least one CP motion vector in the affine-based mode by applying the at least one of the CP positions to the motion linear model to generate one of a plurality of affine candidates. The CP positions may include at least two of a top-left corner, a top-right corner, and a bottom-left corner of the block unit.

In some implementations, the decoder module 114 may determine the CP motion vectors in the affine-based mode by applying all of the CP positions to the motion linear model to generate one of the affine candidates. In some implementations, the decoder module 114 may determine two of the CP motion vectors for the affine-based mode by applying two of the CP positions to the motion linear model and further receive another one of the CP motion vectors from one of the neighboring blocks adjacent CP positions other than the two of the CP positions in order to generate one of the affine candidates. In some implementations, the decoder module 114 may determine one of the CP motion vectors for the affine-based mode by applying one of the CP positions to the motion linear model and further receive another one of the CP motion vectors from one of the neighboring blocks adjacent CP positions other than the two of the CP positions in order to generate one of the affine candidates.

In some implementations, when the block unit is reconstructed in a four-parameter affine motion model, the decoder module 124 may determine the four-parameter affine motion model based on two CP motion vectors. In some implementations, when the block unit is reconstructed in a six-parameter affine motion model, the decoder module 124 may determine the six-parameter affine motion model based on three CP motion vectors. In some implementations, a specific one of the derived motion vectors of the block unit may be derived for a specific one of the sub-block units by applying a corresponding one of the sub-block positions to one of the four-parameter affine motion model and the six-parameter affine motion model. Then, the decoder module 124 may reconstruct each of the sub-block units based on a corresponding one of the plurality of derived motion vectors to reconstruct the block unit. In some implementations, the decoder module 124 may use the derived motion vectors to predict the sub-block units, generate the predicted sub-blocks, and further combine the predicted sub-blocks to generate the predicted block.

In some implementations, when the neighboring blocks adjacent a specific one of the CP positions are not reconstructed based on a motion vector, there may be no CP motion vector for the specific CP position. Thus, the decoder module 124 may directly determine the CP motion vector for the specific CP position by applying the specific CP position to the motion linear model in order to generate one of the affine candidates. In some implementations, even if at least one of the neighboring blocks adjacent the specific CP position are reconstructed based on at least one motion vector, the decoder module 124 may still be able to apply the specific CP position to the motion linear model to determine one CP motion vector for generating one of the affine candidates without using the at least one motion vector.

In some implementations, the decoder module 124 may further add a plurality of residual components into the predicted block to reconstruct the block unit. The residual components may be determined based on the bitstream. The decoder module 124 may reconstruct all of the other block units in the current frame for reconstructing the current frame and the video data. The method/process 300 may then end.

Figure 5:
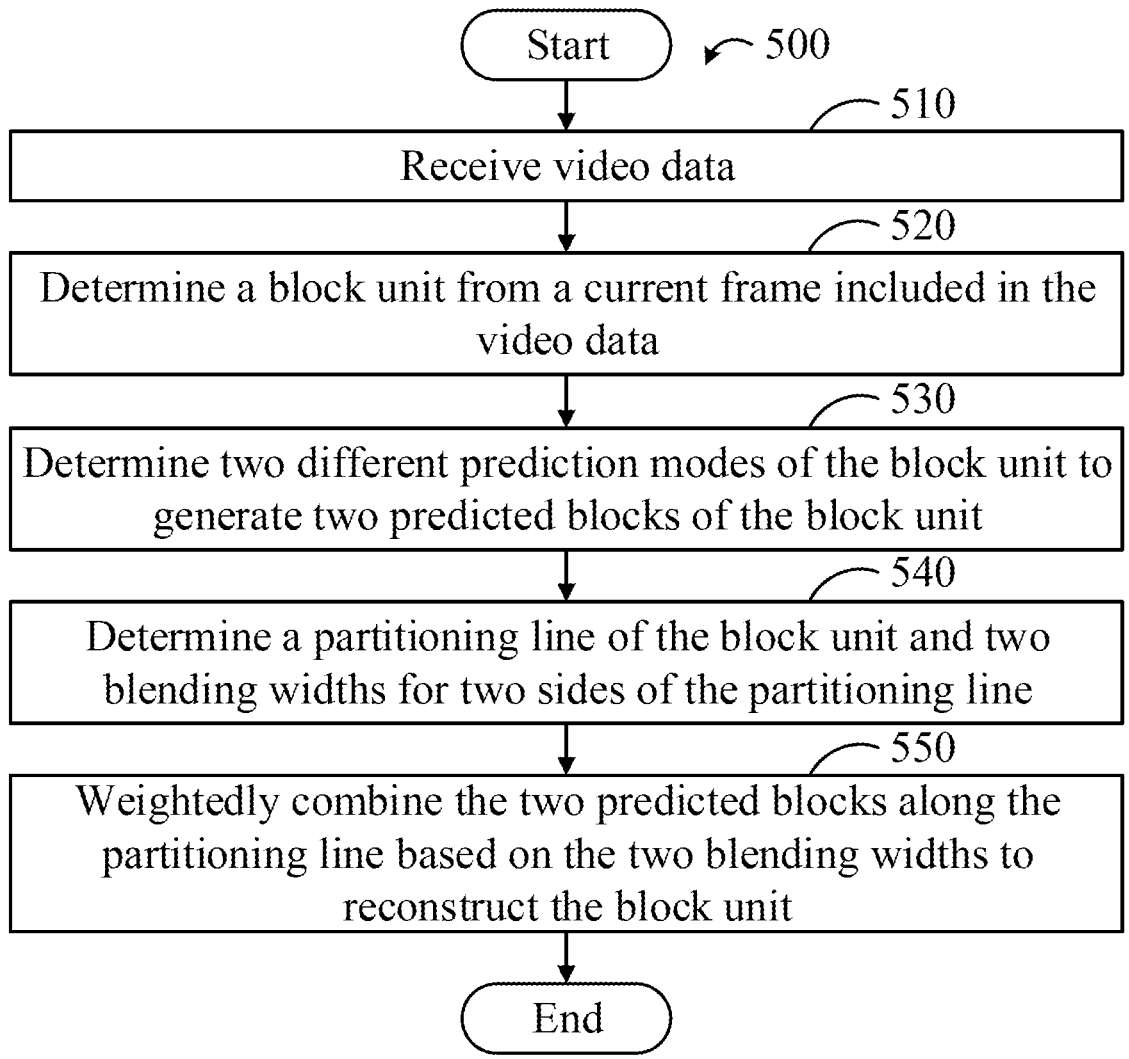
FIG. 5 is a flowchart illustrating a method/process for decoding and/or encoding video data by an electronic device, in accordance with one or more example implementations of this disclosure.

FIG. 5 is a flowchart illustrating a method/process 500 for decoding and/or encoding video data by an electronic device, in accordance with one or more example implementations of this disclosure. The method/process 500 is an example implementation, as there is a variety of different methods to decode the video data.

The method/process 500 may be performed by an electronic device using the configurations illustrated in FIGS. 1 and 2, and, as such, various elements of these figures are referenced with the description of the method/process 300. Each block illustrated in FIG. 5 may represent one or more processes, methods, or subroutines performed by an electronic device.

The order in which the blocks appear in FIG. 5 is for illustration only, and may not be intended to limit the scope of the present disclosure, thus may change in different implementations. Additional blocks may be added or fewer blocks may be utilized without departing from the present disclosure.

At block 510, the method/process 500 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 520, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined from the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications using a video coding standard. The size of the block unit may be Wb×Hb. In some implementations, the values Wb and Hb may be positive integers (e.g., 4, 8, etc.) that may be equal to, or different from, each other.

At block 530, the decoder module 124 may determine two different prediction modes of the block unit to generate two predicted blocks of the block unit.

With reference to FIGS. 1 and 2, the decoder module 124 may determine a first prediction mode and a second prediction mode from a plurality of candidate modes. In some implementations, the two predicted blocks of the block unit may include a first predicted block and a second predicted block respectively determined based on the first prediction mode and the second prediction mode. Thus, the decoder module 124 may predict the block unit based on the first prediction mode to generate the first predicted block and predict the block unit based on the second prediction mode to generate the second predicted block. In some implementations, the first predicted block may be different from the second predicted block.

In some implementations, the first prediction mode may be different from the second prediction mode. The prediction indications may include a first prediction index and a second prediction index. The first prediction index may indicate the first prediction mode included in at least one of a motion candidate list or an intra prediction list, and the second prediction index may indicate the second prediction mode in at least one of the motion candidate list or the intra prediction list.

In some implementations, the intra prediction list may be an intra candidate list and the candidate modes in the intra candidate list may include a plurality of intra candidate modes (e.g., a planar mode, a parallel mode, and a perpendicular mode) selected from a plurality of intra predefined modes. In some implementations, a direction of the parallel mode may be completely or nearly parallel to a partitioning line of a geometric partitioning mode (GPM) and a direction of the perpendicular mode may be completely or nearly perpendicular to the partitioning line of the GPM when the prediction indications indicate that the block unit may be predicted in the GPM (e.g., when a block-level GPM enabled flag of the block unit is true). In some implementations, the intra candidate list may be a most probable mode (MPM) list. The MPM list may include at least one of a plurality of primary MPMs or a plurality of secondary MPMs in Versatile Video Coding (VVC) or Enhanced Compression Mode (ECM). The MPM list may include a plurality of MPMs in a spatial GPM of ECM.

In some implementations, the motion candidate list may be a merge candidate list and the candidate modes in the merge candidate list may include a plurality of merge candidate modes. In some implementations, the merge candidate modes in the merge candidate list may be selected from a plurality of spatial motion prediction modes of a plurality of neighboring blocks neighboring the block unit, a plurality of temporal motion prediction modes of a plurality of collocated blocks, history-based motion prediction modes stored in a first-in-first-out (FIFO) table, a plurality of pair-wise average motion prediction modes, and a zero motion mode. In some implementations, the first prediction mode may indicate a first reference frame and a first reference vector, and the second prediction mode may indicate a second reference frame and a second reference vector. The first reference frame and the second reference frame may be selected from a plurality of reference lists of the block unit. In some implementations, the first reference frame and the second reference frame may be selected from the same one of the reference lists. In some implementations, the first reference frame and the second reference frame may be selected from different reference lists. In some implementations, the number of the reference lists may be equal to 2.

In some implementations, the merge candidate list may be a GPM merge list and the candidate modes may include a plurality of GPM merge modes when the block unit is reconstructed in the GPM. Thus, the first prediction index and the second prediction index may include two indices, merge_gpm_idx0 and merge_gpm_idx1, when the first prediction mode and the second prediction mode are selected from the GPM merge list.

At block 540, the decoder module 124 may determine a partitioning line of the block unit and two blending widths for two sides of the partitioning line.

With reference to FIGS. 1 and 2, the decoder module 124 may determine the partitioning line of the block unit from a plurality of candidate lines when the prediction indications indicate that the block unit may be predicted in the GPM. The decoder module 124 may divide the block unit into a pair of geometric partitions along the partitioning line when the decoder module 124 selects the partitioning line of the block unit for reconstructing the block unit by using the GPM.

In some implementations, the prediction indications may include a partition index of the GPM for the block unit. The partition index may indicate the partitioning line of the block unit selected from the candidate lines. In some implementations, the partitioning line may be one of a diagonal split line and an anti-diagonal direction when the partition index is a triangle partition index. In some implementations, the partition index may indicate a partition angle index and a partition distance index when the partition index is a geometric partition index. The partition angle index may indicate an inclined angle of the partitioning line, and the partition distance index may indicate a line offset between the partitioning line and a center point of the block unit. Thus, the partitioning line may be determined based on the inclined angle and the line offset indicated by the partition index. In some implementations, the partition index may be an index merge_gpm_partition_idx, the partition angle index may be an index angleIdx, and the partition distance index may be an index distanceIdx. In some implementations, the partition index may be an index partition_mode_idx determined based on sgpm_cand_idx. In some implementations, the partition angle index may be used to determine one of the parallel mode and the perpendicular mode when one of the first prediction mode and the second prediction mode may be the one of the parallel mode and the perpendicular mode.

In some implementations, there may be a GPM set index for simultaneously selecting the partitioning line and the two different prediction modes. In other words, the decoder module 124 may select a GPM parameter set from a plurality of GPM candidate sets in a GPM set list. Each of the GPM candidate sets may include one of the candidate lines and further include two of the candidate modes. Thus, when the decoder module 124 determines the GPM parameter set based on the GPM set index, the decoder module 124 may determine the partitioning line and the two different prediction modes at the same time.

The decoder module 124 may determine the two blending widths from a plurality of candidate widths. In some implementations, the two blending widths may be selected from the candidate widths without parsing any width index directly indicating the two blending widths of the block unit. In some implementations, the two blending widths may be selected from the candidate widths by parsing at least one width index directly indicating the two blending widths of the block unit. In some implementations, the candidate widths may be included in a width candidate list.

Figure 6A:
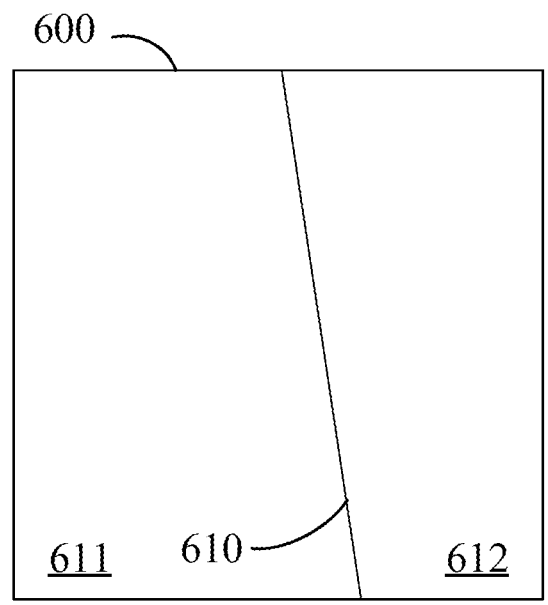
FIG. 6A illustrates an example implementation of a pair of geometric partitions and divided from a block unit along a partitioning line, in accordance with one or more example implementations of this disclosure.
Figure 6B:
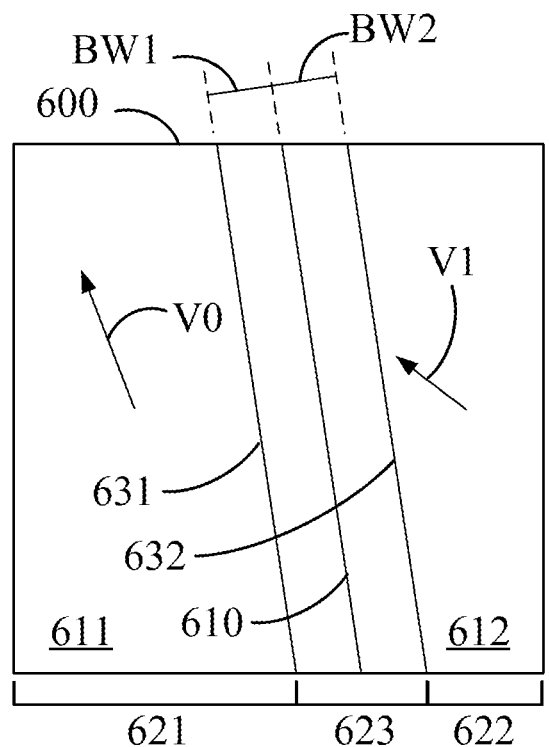
FIG. 6B illustrates an example implementation of the block unit having different prediction areas separated based on the partitioning line and two blending widths, in accordance with one or more example implementations of this disclosure.

FIG. 6A illustrates an example implementation of a pair of geometric partitions 611 and 612 divided from a block unit 600 along a partitioning line 610, in accordance with one or more example implementations of this disclosure. FIG. 6B illustrates an example implementation of the block unit 600 having different prediction areas 621, 622, and 623, separated based on the partitioning line 610 and two blending widths (BWs) BW1 and BW2, in accordance with one or more example implementations of this disclosure. The prediction indications of the block unit 600 may indicate the partitioning line 610, a first reference vector V0, a second reference vector V1, a first reference frame, and a second reference frame (not explicitly shown). The block unit 600 may be divided based on the partitioning line 610 to determine the geometric partitions 611 and 612. In order to predict the block unit 600 by using the GPM, the decoder module 124 may determine the prediction areas 621, 622, and 623, based on the partitioning line 610 and the two BWs.

A pair of blending lines 631 and 632 neighboring the partitioning line 610 may divide the block unit 600 into the prediction areas 621, 622, and 623. A first distance between the partitioning line 610 and a first one of the blending lines 631 may be equal to a first blending width BW1, and a second distance between the partitioning line 610 and a second one of the blending lines 632 may be equal to a second blending width BW2. The first prediction area 621 may be divided by the first blending line 631 that is included in the geometric partition 611 corresponding to the first prediction area 621, and the second prediction area 622 may be divided by the second blending line 632 that is included in the geometric partition 612 corresponding to the second prediction area 622. In addition, the third prediction area 623 may be divided from the block unit 600 by the pair of blending lines 631 and 632.

In some implementations, the decoder module 124 may select the two blending widths BW1 and BW2 from the candidate widths. In some implementations, the candidate widths may include ½, 1, 2, 4, and 8. In some implementations, the candidate widths may include 0, θ/2, θ, 2θ, and 4θ. In some implementations, the candidate widths may include θ/4, θ, and 4θ. In some implementations, a width unit θ may be equal to 2, 4, or other positive integers. For example, the candidate width equal to one may be equal to a distance between two neighboring ones of a plurality of samples in the current frame.

In some implementations, the prediction indications may include two width indices for respectively indicating one of the two blending widths BW1 and BW2. A first one of the two width indices may indicate the first blending width BW1 for a left side of the partitioning line 610, and a second one of the two width indices may indicate the second blending width BW2 for a right side of the partitioning line 610. In some implementations, the two width indices may be different from each other, so the first blending width BW1 may be different from the second blending width BW2. In addition, the two width indices may be identical to each other, so the first blending width BW1 may be identical to the second blending width BW2.

In some implementations, the number of the candidate widths in the width candidate list may be adjusted based on the line offset of the partitioning line 610 (i.e., the partition distance index of the partitioning line 610). For example, the number of the candidate widths for selecting the first blending width BW1 may be adjusted based on the line offset of the partitioning line 610. In addition, the number of the candidate widths for selecting the second blending width BW2 may also be adjusted based on the line offset of the partitioning line 610. When the line offset of the partitioning line 610 is equal to zero, the partitioning line 610 may penetrate through a center point of the block unit 600. Thus, the sizes and the shapes of the geomatic partition 611 and 612 may be identical to each other, and the number of the candidate widths for selecting the first blending width BW1 and the number of the candidate widths for selecting the second blending width BW2 may remain unchanged. In some implementations, when the line offset of the partitioning line 610 is different from zero, a specific one of the two geomatic partitions may be greater than the other one of the two geomatic partitions. Thus, at least one of the number of the candidate widths for a bigger one of the two geomatic partitions or the number of the candidate widths for a smaller one of the two geomatic partitions may be adjusted. For example, the number of the candidate widths for the bigger one of the two geomatic partitions may be greater than the number of the candidate widths for the smaller one of the two geomatic partitions after the adjustment.

In some implementations, the number of the candidate widths in the width candidate list may be adjusted based on the line offset of the partitioning line 610 (i.e., the partition distance index of the partitioning line 610). For example, the number of the candidate widths for selecting the two blending widths BW1 and BW2 may be adjusted based on the line offset of the partitioning line 610 and an offset threshold. In some implementations, the number of the candidate widths for the bigger one of the two geomatic partitions may be increased to generate the adjusted width candidate list when the line offset of the partitioning line 610 is greater than the offset threshold. In addition, the number of the candidate widths for the smaller one of the two geomatic partitions may remain unchanged or be reduced.

In some implementations, after one of the two width indices is parsed or a specific one of the two blending widths BW1 and BW2 is determined, the number of the candidate widths for selecting the other one of the two blending widths BW1 and BW2 may be adjusted. In some implementations, after one of the two width indices is parsed or a specific one of the two blending widths BW1 and BW2 is determined, the number of the candidate widths for selecting the other one of the two blending widths BW1 and BW2 may be reduced. In some implementations, when the specific blending width is determined to be equal to Ws (being a positive integer), the other one of the two blending widths BW1 and BW2 may be limited to be less than Ws.

In some implementations, when the specific blending width is determined to be equal to Ws, the other one of the two blending widths BW1 and BW2 may be limited to be less than or equal to Ws. For example, when the first blending width BW1 is determined to be equal to 2, the number of the candidate widths for selecting the second blending width BW2 may be less than or equal to 2. In some implementations, after one of the two width indices is parsed or a specific one of the two blending widths BW1 and BW2 is determined, the number of the candidate widths for selecting the other one of the two blending widths BW1 and BW2 may be increased. In some implementations, when the specific blending width is determined to be equal to Ws, the other one of the two blending widths BW1 and BW2 may be limited to be greater than Ws. In some implementations, when the specific blending width is determined to be equal to Ws, the other one of the two blending widths BW1 and BW2 may be limited to be greater than or equal to Ws.

In some implementations, the prediction indications may include only one width index for indicating a specific one of the two blending widths BW1 and BW2 when the other one of the two blending widths BW1 and BW2 is predefined in the method/process 500 or pre-selected prior to parsing the width index of the block unit 600. For example, one of the two blending widths BW1 and BW2 may be equal to a predefined width defined in the method/process 500, and the other one of the two blending widths BW1 and BW2 may be selected from the with candidate list based on the width index. In some implementations, there may be a predefined table storing a one-to-one correspondence between the first blending width BW1 and the second blending width BW2 in the method/process 500. Thus, when one of the two blending widths BW1 and BW2 is selected from the with candidate list based on the width index, the other one of the two blending widths BW1 and BW2 may be directly determined based on the predefined table by using the width index. In some implementations, one of the two blending widths BW1 and BW2 of the block unit 600 may be equal to one of the first blending width BW1 and the second blending width BW2 of a previously reconstructed block reconstructed prior to the reconstruction of the block unit 600. In addition, the other one of the two blending widths BW1 and BW2 of the block unit 600 may be selected from the width candidate list based on the width index of the block unit 600. In some implementations, the first blending width BW1 may be different from or equal to the second blending width BW2.

In some implementations, the prediction indications may include a width set index for directly indicating the first blending width BW1 and the second blending width BW2 by only one index. For example, when there are Ncw candidate widths in the width candidate list, there may be Ncc candidate combinations. In some implementations, the numbers Ncw and Ncc may be positive integers. The number Ncc may be determined based on the number Ncw by using a predefined rule. In some implementations, the number Ncc may be equal to Ncw×Ncw. In some implementations, the number Ncc may be equal to Ncw×(Ncw−Nr) when the number of the candidate widths for one of the two blending widths BW1 and BW2 is greater than the number of the candidate widths for the other blending width. In some implementations, the number Ncc may be equal to Ncw when one of the two blending widths BW1 and BW2 may be directly determined based on the other blending width. Thus, when the decoder module 124 receives the width set index, the decoder module 124 may determine the two blending widths BW1 and BW2 based on a predefined width table by using the width set index. The predefined width table may store a relationship between the width set indices and the Ncc candidate combinations.

In some implementations, the number of the candidate widths in an original width candidate list may be adjusted to generate an adjusted width candidate list based on a size parameter of the block unit 600. For example, the number of the candidate widths for selecting the first blending width BW1 may be adjusted based on the size parameter of the block unit 600. In addition, the number of the candidate widths for selecting the second blending width BW2 may also be adjusted based on the size parameter of the block unit 600. In some implementations, the number of the candidate widths for selecting the two blending widths BW1 and BW2 may increase to generate the adjusted width candidate list when the size parameter of the block unit 600 is greater than a size threshold. In some implementations, the number of the candidate widths for selecting the two blending widths BW1 and BW2 may be reduced to generate the adjusted width candidate list when the size parameter of the block unit 600 is less than a size threshold. In some implementations, the size threshold may be a positive integer equal to 16, 24, 32, 64, or other integers. For example, the number of the candidate widths for selecting the two blending widths BW1 and BW2 may be originally equal to five. In addition, there may be at least one size threshold for determining the number of the candidate widths in the method/process 500. In some implementations, the at least one size threshold may include 16 and 32. Thus, when the size parameter of the block unit 600 is less than a first size threshold equal to 32, the number of the candidate widths for selecting the two blending widths BW1 and BW2 may be adjusted to be equal to 3. In addition, when the size parameter of the block unit 600 is less than a second size threshold equal to 16, the number of the candidate widths for selecting the two blending widths BW1 and BW2 may be adjusted to be equal to 1. In some implementations, the at least one size threshold may only include 16. In some implementations, when the size parameter of the block unit 600 is less than the size threshold equal to 16, the number of the candidate widths for selecting the two blending widths BW1 and BW2 may be adjusted to be equal to 3. In some implementations, when the size parameter of the block unit 600 is less than the size threshold equal to 16, the number of the candidate widths for selecting the two blending widths BW1 and BW2 may be adjusted to be equal to 1.

In some implementations, when the number of the candidate widths for selecting the two blending widths BW1 and BW2 is adjusted to be equal to 1 based on the comparison between the size parameter and the size threshold, the two blending widths BW1 and BW2 may be selected from the only one candidate width in the adjusted width candidate list. Thus, the two blending widths BW1 and BW2 of the partitioning line 610 may be directly determined to be equal to the only one candidate width in the adjusted width candidate list without further parsing or considering any other syntax. In other words, the two blending widths BW1 and BW2 of the partitioning line 610 may be determined from the plurality of candidate widths in the original width candidate list only and directly based on the comparison between the size parameter and the size threshold without further parsing or considering any other syntax. Thus, the decoder module 124 may compare the size parameter of the block unit 600 with the size threshold to directly select the two blending widths BW1 and BW2 of the partitioning line 610 from the candidate widths in the original candidate width without parsing any syntax directly indicating the two blending widths. In other words, the two blending widths of the partitioning line 610 may be both equal to a predefined one of the candidate widths when the size parameter is less than the size threshold. Thus, when the size parameter of the block unit 600 is small, the number of bits in the bitstream may be reduced and a coding efficiency may be increased.

In some implementations, the size parameter of the block unit 600 used to compare with the size threshold may be equal to the width Wb of the block unit 600. In some implementations, the size parameter of the block unit 600 may be equal to the height Hb of the block unit 600. In some implementations, the size parameter of the block unit 600 may be equal to a size value generated by multiplying the width W of the block unit 600 by the height H of the block unit 600. In some implementations, the size parameter of the block unit 600 may be equal to a size value generated by dividing the width W of the block unit 600 by the height H of the block unit 600. In some implementations, the size parameter of the block unit 600 may be a size value generated by dividing the height H of the block unit 600 by the width W of the block unit 600. In some implementations, the size parameter of the block unit 600 may be equal to a maximum value of the height H and the width W of the block unit 600. In some implementations, the size parameter of the block unit 600 may be equal to a minimum value of the height H and the width W of the block unit 600. In some implementations, the size parameter of the block unit 600 may be calculated based on at least one of the width W of the block unit 600 or the height H of the block unit 600.

In some implementations, the number of the candidate widths for selecting the two blending widths BW1 and BW2 may be determined based on a block shape of the block unit 600. For example, the decoder module 124 may determine whether the block unit 600 is one of a narrow block and a wide block or not. In some implementations, when the block width Wb of the block unit 600 is greater than N1×Hb, the block unit 600 may be determined as the wide block. In addition, when the block height Hb of the block unit 600 is greater than N2×Wb, the block unit 600 may be determined as the narrow block. In some implementations, the numbers N1 and N2 may be positive integers greater than or equal to one. In addition, the number N1 may be equal to or different from the number N2. In some implementations, when the block unit 600 is one of the narrow block and the wide block, the number of the candidate widths in the original width candidate list for selecting the two blending widths BW1 and BW2 may be reduced to generate the adjusted width candidate list. In some implementations, when the block unit 600 is different from the narrow block and the wide block, the number of the candidate widths in the original width candidate list for selecting the two blending widths BW1 and BW2 may remain unchanged.

In some implementations, the number of the candidate widths for selecting the two blending widths BW1 and BW2 may be determined based on the inclined angle of the partitioning line 610 (i.e., the partition angle index of the partitioning line 610). In some implementations, when the block unit 600 is the narrow block and the inclined angle of the partitioning line 610 is close to a vertical angle (e.g., a vertical partitioning line), the number of the candidate widths for selecting the two blending widths BW1 and BW2 may be reduced. In some implementations, when the block unit 600 is the wide block and the inclined angle of the partitioning line 610 is close to a horizontal angle (e.g., a horizontal partitioning line), the number of the candidate widths for selecting the two blending widths BW1 and BW2 may be reduced.

In some implementations, the number of the candidate widths for selecting the two blending widths BW1 and BW2 may be determined based on a high-level syntax element included in a parameter set. In some implementations, there may be a plurality of different width candidate lists in the method/process 500. In some implementations, the number of the width candidate lists may be equal to two. The number of the candidate widths included in a first one of the two width candidate list may be equal to Nx, and the number of the candidate widths included in a second one of the two width candidate list may be equal to Ny. The numbers Nx and Ny may be positive integers, and the number Nx may be greater than the number Ny. In some implementations, the high-level syntax element may include a high-level flag indicating which one of the width candidate lists is selected. In addition, the parameter set may be one of a video parameter set (VPS), a sequence parameter set (SPS), a picture parameter set (PPS), or any other parameter set having a syntax level higher than that of a block syntax structure. The block syntax structure may include a coding unit header. In some implementations, the number Ny may be equal to one. Thus, when the high-level flag in the parameter set indicates that the only one candidate width included in the second one of the two width candidate list is used to determine the two blending widths BW1 and BW2, the decoder module 124 may directly determine the two blending widths BW1 and BW2 of the partitioning line 610 without further parsing any syntax in the block syntax structure.

In some implementations, at least one of a plurality of above quantity procedures for determining the number of the candidate widths and at least one of a plurality of above selection procedures for selecting the blending widths from the candidate widths may combine to be performed without departing from the present disclosure. In some implementations, the decoder module 124 may first determine the number of the candidate widths for a first geometric partition by using one of the above quantity procedures, and then select the blending width BW1 from the candidate widths of the first geometric partition by using one of the above selection procedures. Then, the decoder module 124 may determine the number of the candidate widths for a second geometric partition by using one of the above quantity procedures, and then select the blending width BW2 from the candidate widths of the second geometric partition by using one of the above selection procedure. In some implementations, the decoder module 124 may simultaneously determine the number of the candidate widths for a first geometric partition and the number of the candidate widths for a second geometric partition by using one of the above quantity procedures. Then, the decoder module 124 may further select the blending width BW1 from the candidate widths of the first geometric partition and select the blending width BW2 from the candidate widths of the second geometric partition by using one of the above selection procedures.

Referring back to FIG. 5, at block 550, the decoder module 124 may weightedly combine the two predicted blocks along the partitioning line based on the two blending widths to reconstruct the block unit.

With reference to FIGS. 1 and 2, the decoder module 124 may determine two blending matrices (e.g., W0 and W1) for the two predicted blocks based on the two blending widths BW1 and BW2. A plurality of weight values in the two blending matrices may be within a range of 0 to P (e.g., [0, P]). In some implementations, the number P may be a positive integer (e.g., 8). The weight values in each of the two blending matrices may be derived based on a displacement d(xc, yc) between a sample position (xc, yc) to the partitioning line. In some implementations, the weight values in each of the two blending matrices may be given by a discrete ramp function with the displacement and the two blending widths BW1 and BW2. For example, the weight values w(xc, yc) in one of the blending matrices may be given by the ramp function as follow:

$$w(xc, yc) = \begin{cases} 0 & d(xc, yc) \leq -BW1 \\ (8/(2 \times BW1)) \times (d(xc, yc) + BW1) & -BW1 < d(xc, yc) \leq 0 \\ (8/(2 \times BW2)) \times (d(xc, yc) + BW2) & 0 < d(xc, yc) \leq BW2 \\ 8 & d(xc, yc) \geq BW2 \end{cases}$$

The decoder module 124 may weightedly combine the two predicted blocks along the partitioning line based on the blending width to generate a prediction block. In some implementations, with reference to FIG. 6, the first prediction area 621 may be predicted only based on the first prediction mode, and the second prediction area 622 may be predicted only based on the second prediction mode. In addition, the third prediction area 623 may be predicted based on the first prediction mode and the second prediction mode through the two blending matrices. Then, the decoder module 124 may further add a plurality of residual components into the prediction block to reconstruct the block unit. The residual components may be determined based on the bitstream. The decoder module 124 may reconstruct all of the other block units in the current frame for reconstructing the current frame and the video data. The method/process 500 may then end.

Figure 7:
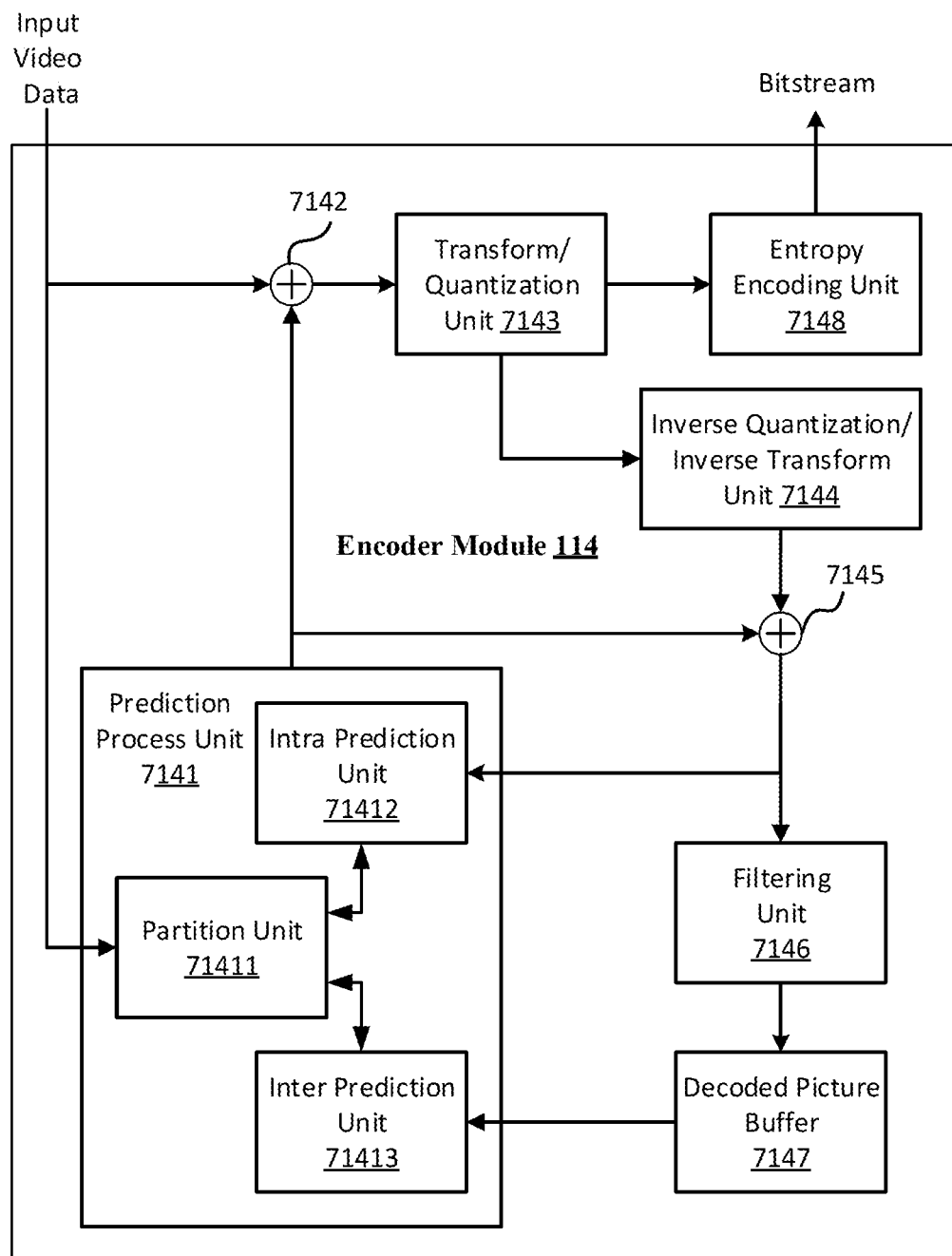
FIG. 7 is a block diagram illustrating an encoder module of the first electronic device illustrated in FIG. 1, in accordance with one or more example implementations of this disclosure.

FIG. 7 is a block diagram illustrating an encoder module 114 of the first electronic device 110 illustrated in FIG. 1, in accordance with one or more example implementations of this disclosure. The encoder module 114 may include a prediction processor (e.g., a prediction process unit 7141), at least a first summer (e.g., a first summer 7142) and a second summer (e.g., a second summer 7145), a transform/quantization processor (e.g., a transform/quantization unit 7143), an inverse quantization/inverse transform processor (e.g., an inverse quantization/inverse transform unit 7144), a filter (e.g., a filtering unit 7146), a decoded picture buffer (e.g., a decoded picture buffer 7147), and an entropy encoder (e.g., an entropy encoding unit 7148). The prediction process unit 7141 of the encoder module 114 may further include a partition processor (e.g., a partition unit 71411), an intra prediction processor (e.g., an intra prediction unit 71412), and an inter prediction processor (e.g., an inter prediction unit 71413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, CTUs, CBs, sub-divisions thereof, and/or other equivalent coding units.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 7141 may receive a current image block of a specific one of the image frames. The current image block may be the luminance block or one of the chrominance blocks in the specific image frame.

The partition unit 71411 may divide the current image block into multiple block units. The intra prediction unit 71412 may perform intra-predictive coding of a current block unit relative to one or more neighboring blocks in the same frame as the current block unit in order to provide spatial prediction. The inter prediction unit 71413 may perform inter-predictive coding of the current block unit relative to one or more blocks in one or more reference image blocks to provide temporal prediction.

The prediction process unit 7141 may select one of the coding results generated by the intra prediction unit 71412 and the inter prediction unit 71413 based on a mode selection method, such as a cost function. The mode selection method may be a rate-distortion optimization (RDO) process.

The prediction process unit 7141 may determine the selected coding result and provide a predicted block corresponding to the selected coding result to the first summer 7142 for generating a residual block and to the second summer 7145 for reconstructing the encoded block unit. The prediction process unit 7141 may further provide syntax elements, such as motion vectors, intra mode indicators, partition information, and/or other syntax information, to the entropy encoding unit 7148.

The intra prediction unit 71412 may intra predict the current block unit. The intra prediction unit 71412 may determine an intra prediction mode directed toward a reconstructed sample neighboring the current block unit in order to encode the current block unit.

The intra prediction unit 71412 may encode the current block unit using various intra prediction modes. The intra prediction unit 71412 of the prediction process unit 7141 may select an appropriate intra prediction mode from a plurality of default modes, and the default modes may include at least one of Planar, DC, and angular modes. The intra prediction unit 71412 may encode the current block unit using a cross component prediction mode to predict one of the two chroma components of the current block unit based on the luma components of the current block unit. The intra prediction unit 71412 may predict a first one of the two chroma components of the current block unit based on the second of the two chroma components of the current block unit.

The inter prediction unit 71413 may inter predict the current block unit as an alternative to the intra prediction performed by the intra prediction unit 71412. The inter prediction unit 71413 may perform motion estimation to estimate motion of the current block unit for generating a motion vector.

The motion vector may indicate a displacement of the current block unit within the current image block relative to a reference block unit within a reference image block. The inter prediction unit 71413 may receive at least one reference image block stored in the decoded picture buffer 7147 and estimate the motion based on the received reference image blocks to generate the motion vector.

The first summer 7142 may generate the residual block by subtracting the prediction block determined by the prediction process unit 7141 from the original current block unit. The first summer 7142 may represent the component or components that perform this subtraction.

The transform/quantization unit 7143 may apply a transform to the residual block in order to generate a residual transform coefficient and then quantize the residual transform coefficients to further reduce bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 7143 may perform a scan of the matrix including the quantized transform coefficients. Alternatively, the entropy encoding unit 7148 may perform the scan.

The entropy encoding unit 7148 may receive a plurality of syntax elements from the prediction process unit 7141 and the transform/quantization unit 7143, including a quantization parameter, transform data, motion vectors, intra modes, partition information, and/or other syntax information. The entropy encoding unit 7148 may encode the syntax elements into the bitstream.

The entropy encoding unit 7148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 7144 may apply inverse quantization and inverse transformation to reconstruct the residual block in the pixel domain for later use as a reference block. The second summer 7145 may add the reconstructed residual block to the prediction block provided from the prediction process unit 7141 in order to produce a reconstructed block for storage in the decoded picture buffer 7147.

The filtering unit 7146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 7145.

The decoded picture buffer 7147 may be a reference picture memory that stores the reference block for use by the encoder module 114 to encode video, such as in intra or inter coding modes. The decoded picture buffer 7147 may include a variety of memory devices, such as DRAM (e.g., including SDRAM), MRAM, RRAM, or other types of memory devices. The decoded picture buffer 7147 may be on-chip with other components of the encoder module 114 or off-chip relative to those components.

The method/process 300 for decoding and/or encoding video data may be performed by the first electronic device 110. With reference to FIGS. 1, 3, and 7, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate a plurality of CTUs, and further divide one of the CTUs to determine the block unit according to the partition indications based on any video coding standard.

With reference to FIGS. 1, 3, and 7, at block 330, the encoder module 114 may determine a plurality of neighboring sub-partitions selected from a plurality of neighboring sub-blocks. The encoder module 114 may determine a plurality of neighboring blocks spatially neighboring the block unit and reconstructed prior to the reconstruction of the block unit. Each of the neighboring blocks may further include a plurality of neighboring sub-blocks. Each of the neighboring sub-blocks may have the same size and the same shape. The neighboring sub-partitions may be selected from the neighboring sub-blocks. The neighboring sub-blocks included in a neighboring region may be selected as the neighboring sub-partitions, and the other neighboring sub-blocks excluded from the neighboring region may be excluded from the neighboring sub-partitions. The selection scheme for the neighboring sub-partitions in the encoder module 114 may be identical to that in the decoder module 124. In other words, the neighboring region in the encoder module 114 may be identical to that in the decoder module 124.

With reference to FIGS. 1, 3, and 7, at block 340, the encoder module 114 may determine, from the current frame, more than one previously affine-coded block reconstructed in an affine-based mode prior to the reconstruction of the block unit. In some implementations, the selection scheme for the more than one previously affine-coded block in the encoder module 114 may be identical to that in the decoder module 124. Each of the more than one previously affine-coded block may include a plurality of affine-coded sub-blocks. Thus, the selection scheme for the affine-coded sub-blocks in the encoder module 114 may be identical to that in the decoder module 124.

With reference to FIGS. 1, 3, and 7, at block 350, the encoder module 114 may receive a plurality of neighboring motion vectors of the neighboring sub-partitions and a plurality of affine motion vectors of the affine-coded sub-blocks. Since the neighboring blocks and the more than one previously affine-coded blocks have been predicted and reconstructed prior to the prediction and the reconstruction of the block unit, the encoder module 114 may directly receive the prediction modes of the neighboring blocks and the more than one previously affine-coded blocks when the block unit is being reconstructed. In addition, the prediction modes of the neighboring blocks and the more than one previously affine-coded blocks performed in the encoder module 114 may be identical to those performed in the decoder module 124. Thus, the neighboring motion vectors of the neighboring sub-partitions and the affine motion vectors of the affine-coded sub-blocks received in the encoder module 114 may be identical to those received in the decoder module 124.

With reference to FIGS. 1, 3, and 7, at t block 360, the encoder module 114 may derive a motion linear model based on the neighboring motion vectors and the neighboring positions of the neighboring sub-partitions and the affine motion vectors and the affine positions of the affine-coded sub-blocks. In some implementations, the motion linear model may be derived by a regression-based motion vector field (RMVF) derivation. A plurality of model parameters of the motion linear model may be derived by using the neighboring motion vectors and the neighboring positions of the neighboring sub-partitions and the affine motion vectors and the affine positions of the affine-coded sub-blocks to solve the motion linear model in an error function. In some implementations, the error function may be a mean square error (MSE) function.

With reference to FIGS. 1, 3, and 7, at block 370, the encoder module 114 may determine a plurality of derived motion vectors for the block unit based on the motion linear model for reconstructing the block unit. The encoder module 114 may divide the block unit into a plurality of sub-block units and determine a sub-block position for each of the sub-block units. A specific one of the derived motion vectors of the block unit may be derived for a specific one of the sub-block units by applying a corresponding one of the sub-block positions to the motion linear model. Then, the encoder module 114 may reconstruct each of the sub-block units based on a corresponding one of the derived motion vectors to reconstruct the block unit. In addition, each of the sub-block units may have the same reference frame, so the encoder module 114 may use the derived motion vectors and the reference frame to predict the sub-block units and generate a plurality of predicted sub-blocks. In some implementations, the reference frame of the block unit may be determined based on the reference frames stored in the stored motion information of the neighboring sub-partitions and the affine-coded sub-partitions.

In some implementations, when the block unit is reconstructed in the affine-coded mode, the encoder module 114 may determine at least one of a plurality of control point (CP) positions of the block unit in the affine-based mode, and determine at least one CP motion vector in the affine-based mode by applying the at least one of the CP positions to the motion linear model to generate one of a plurality of affine candidates for generating the predicted sub-blocks.

In some implementations, the encoder module 114 may further combine the predicted sub-blocks to generate a predicted block. In some implementations, the encoder module 114 may further add a plurality of residual components into the predicted block to reconstruct the block unit. The residual components may be determined based on the bitstream. The encoder module 114 may reconstruct all of the other block units in the current frame and other frames for reconstructing the current frame and the video data. The method/process 300 may then end.

The method/process 500 for decoding and/or encoding video data may be performed by the first electronic device 110. With reference to FIGS. 1, 5, and 7, at block 510, the method/process 500 may start by the encoder module 114 receiving the video data. The video data received by the encoder module 114 may be a video. At block 520, the encoder module 114 may determine a block unit from a current frame included in the video data. The encoder module 114 may divide the current frame to generate a plurality of CTUs, and further divide one of the CTUs to determine the block unit according to the partition indications using a video coding standard.

With reference to FIGS. 1, 5, and 7, at block 530, the encoder module 114 may determine two different prediction modes of the block unit to generate two predicted blocks of the block unit. At block 540, the encoder module 114 may determine a partitioning line of the block unit and two blending widths for two sides of the partitioning line. In some implementations, the encoder module 114 may simultaneously determine the partitioning line and the two different prediction modes for dividing the block unit into a pair of geometric partitions and generating the two predicted blocks by using the GPM.

In some implementations, the encoder module 114 may generate a plurality of coding results generated by using a plurality of coding prediction modes including a plurality of GPM prediction modes. In some implementations, the coding prediction modes may include a plurality of intra prediction modes, a plurality of inter prediction modes, and a plurality of combined inter and intra prediction (CIIP) modes. In some implementations, each of the GPM prediction modes may have a predefined width, one of a plurality of candidate lines, and one of a plurality of mode combinations including at least two of a plurality of GPM candidate modes. In some implementations, the GPM candidate modes of the GPM prediction modes may be selected from an intra candidate list and a merge candidate list. The intra candidate list may include a plurality of intra candidate modes (e.g., a planar mode, a parallel mode, and a perpendicular mode) selected from a plurality of intra predefined modes. In some implementations, the merge candidate list may include a plurality of merge candidate modes. In some implementations, the intra candidate list may be an MPM list. The MPM list may include at least one of a plurality of primary MPMs or a plurality of secondary MPMs in VVC or ECM. The MPM list may include a plurality of MPMs in a spatial GPM of ECM. In addition, the encoder module 114 may further determine the two blending widths of the partitioning line from a plurality of candidate widths to replace the predefined width of the partitioning line. In some implementations, the encoder module 114 and the decoder module 124 may use the same procedure to determine the two blending widths. Thus, the two blending widths selected by the encoder module 114 may be identical to those selected by the decoder module 124.

The encoder module 114 may traverse the coding prediction modes of the block unit and select one of the coding results based on a mode selection method, such as a cost function. The cost function may include an RDO, a Sum of Absolute Difference (SAD), a Sum of Absolute Transformed Difference (SATD), a Mean Absolute Difference (MAD), a Mean Squared Difference (MSD), and a Structural SIMilarity (SSIM). It should be noted that any cost function may be used without departing from this disclosure. When an initial prediction mode corresponding to the selected one of the coding results is one of the GPM prediction modes with a specific one of the candidate lines and two of the GPM candidate modes, the specific candidate line and the two of the GPM candidate modes may be determined as the partitioning line and the two different prediction modes. In addition, one or two of the candidate widths included in the one of the GPM prediction modes may be determined as the two blending widths.

With reference to FIGS. 1, 5, and 7, at block 550, the encoder module 114 may weightedly combine the two predicted blocks along the partitioning line based on the two blending widths to reconstruct the block unit. The encoder module 114 and the decoder module 124 may use the same process to reconstruct the block unit. In some implementations, the encoder module 114 may further predict the block unit based on the partitioning line, the two different prediction modes, and the two blending widths to determine a plurality of predicted components of the block unit, and then determine a plurality of residual components by comparing a plurality of color components in the block unit with the predicted components. The encoder module 114 may further reconstruct the block unit based on the residual components and the predicted components to generate a plurality of reference samples for a plurality of following blocks that are predicted after predicting the block unit. In addition, the residual components may be encoded into the bitstream by the encoder module 114 for providing to the decoder module 124. The method/process 500 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data by an electronic device, the method comprising:
   receiving the video data;
   determining a block unit from a current frame included in the video data;
   determining a plurality of neighboring sub-partitions selected from a plurality of neighboring sub-blocks, wherein:
      the plurality of neighboring sub-blocks is included in a plurality of neighboring blocks spatially neighboring the block unit and reconstructed prior to reconstructing the block unit, and
      each of the plurality of neighboring sub-partitions is located at a neighboring position;
   determining, from the current frame, more than one previously affine-coded block reconstructed in an affine-based mode prior to reconstructing the block unit, wherein:
      each of the more than one previously affine-coded block includes a plurality of affine-coded sub-blocks,
      each of the plurality of affine-coded sub-blocks is located at an affine position, and
      the plurality of affine-coded sub-blocks is different from the plurality of neighboring sub-partitions;
   receiving a plurality of neighboring motion vectors of the plurality of neighboring sub-partitions and a plurality of affine motion vectors of the plurality of affine-coded sub-blocks;
   deriving a motion linear model based on the plurality of neighboring motion vectors and the plurality of neighboring positions of the plurality of neighboring sub-partitions and the plurality of affine motion vectors and the plurality of affine positions of the plurality of affine-coded sub-blocks; and
   determining a plurality of derived motion vectors for the block unit based on the motion linear model for reconstructing the block unit.

2. The method according to claim 1, wherein the motion linear model is derived using a regression-based motion vector field (RMVF) derivation.

3. The method according to claim 1, wherein a plurality of model parameters is derived by using the plurality of neighboring motion vectors and the plurality of neighboring positions of the plurality of neighboring sub-partitions and the plurality of affine motion vectors and the plurality of affine positions of the plurality of affine-coded sub-blocks to solve the motion linear model in an error function.

4. The method according to claim 3, wherein the error function is a mean square error (MSE) function.

5. The method according to claim 1, wherein:
   each of the plurality of neighboring sub-blocks in a specific one of the plurality of neighboring blocks is determined as one of the plurality of affine-coded sub-blocks when the specific one of the plurality of neighboring blocks is reconstructed in the affine-based mode, and
   one or more of the plurality of neighboring sub-blocks in the specific one of the plurality of neighboring blocks are determined as the plurality of neighboring sub-partitions and the others of the plurality of neighboring sub-blocks in the specific one of the plurality of neighboring blocks are excluded from the plurality of neighboring sub-partitions when the specific one of the plurality of neighboring blocks is reconstructed in a first prediction mode different from the affine-based mode.

6. The method according to claim 5, wherein:
   each of the one or more of the plurality of neighboring sub-blocks is adjacent to the block unit, and
   neighboring sub-blocks other than the one or more of the plurality of neighboring sub-blocks are separated from the block unit by the one or more of the plurality of neighboring sub-blocks.

7. The method according to claim 1, further comprising:
   dividing the block unit into a plurality of sub-block units;
   determining a plurality of sub-block positions of the plurality of sub-block units;
   deriving one of the plurality of derived motion vectors for each of the plurality of sub-block units by applying a corresponding one of the plurality of sub-block positions to the motion linear model; and
   reconstructing each of the sub-block units based on a corresponding one of the plurality of derived motion vectors to reconstruct the block unit.

8. The method according to claim 1, further comprising:
   determining at least one of a plurality of control point (CP) positions of the block unit in the affine-based mode;
   determining at least one CP motion vector in the affine-based mode by applying the at least one of the plurality of CP positions to the motion linear model to generate at least one of a plurality of affine candidates; and
   reconstructing the block unit based on the at least one of the plurality of affine candidates.

9. The method according to claim 1, wherein:
   a sum of a number of the plurality of neighboring sub-partitions and a number of the plurality of affine-coded sub-blocks for deriving the motion linear model is less than or equal to a quantity threshold.

10. An electronic device for decoding video data, the electronic device comprising:
one or more processors; and
one or more non-transitory computer-readable media coupled to the one or more processors and storing one or more computer-executable instructions that, when executed by at least one of the one or more processors, cause the electronic device to:
receive the video data;
determine a block unit from a current frame included in the video data;
determine a plurality of neighboring sub-partitions selected from a plurality of neighboring sub-blocks, wherein:
the plurality of neighboring sub-blocks is included in a plurality of neighboring blocks spatially neighboring the block unit and reconstructed prior to reconstructing the block unit, and
each of the plurality of neighboring sub-partitions is located at a neighboring position;
determine, from the current frame, more than one previously affine-coded block reconstructed in an affine-based mode prior to reconstructing the block unit, wherein:
each of the more than one previously affine-coded block includes a plurality of affine-coded sub-blocks,
each of the plurality of affine-coded sub-blocks is located at an affine position, and
the plurality of affine-coded sub-blocks is different from the plurality of neighboring sub-partitions;
receive a plurality of neighboring motion vectors of the plurality of neighboring sub-partitions and a plurality of affine motion vectors of the plurality of affine-coded sub-blocks;
derive a motion linear model based on the plurality of neighboring motion vectors and the plurality of neighboring positions of the plurality of neighboring sub-partitions and the plurality of affine motion vectors and the plurality of affine positions of the plurality of affine-coded sub-blocks; and
determine a plurality of derived motion vectors for the block unit based on the motion linear model for reconstructing the block unit.

11. The electronic device according to claim 10, wherein the motion linear model is derived using a regression-based motion vector field (RMVF) derivation.

12. The electronic device according to claim 10, wherein a plurality of model parameters is derived by using the plurality of neighboring motion vectors and the plurality of neighboring positions of the plurality of neighboring sub-partitions and the plurality of affine motion vectors and the plurality of affine positions of the plurality of affine-coded sub-blocks to solve the motion linear model in an error function.

13. The electronic device according to claim 12, wherein the error function is a mean square error (MSE) function.

14. The electronic device according to claim 10, wherein:
each of the plurality of neighboring sub-blocks in a specific one of the plurality of neighboring blocks is determined as one of the plurality of affine-coded sub-blocks when the specific one of the plurality of neighboring blocks is reconstructed in the affine-based mode, and
one or more of the plurality of neighboring sub-blocks in the specific one of the plurality of neighboring blocks are determined as the plurality of neighboring sub-partitions and the others of the plurality of neighboring sub-blocks in the specific one of the plurality of neighboring blocks are excluded from the plurality of neighboring sub-partitions when the specific one of the plurality of neighboring blocks is reconstructed in a first prediction mode different from the affine-based mode.

15. The electronic device according to claim 14, wherein:
each of the one or more of the plurality of neighboring sub-blocks is adjacent to the block unit, and
neighboring sub-blocks other than the one or more of the plurality of neighboring sub-blocks are separated from the block unit by the one or more of the plurality of neighboring sub-blocks.

16. The electronic device according to claim 10, wherein the one or more computer-executable instructions, when executed by the at least one of the one or more processors, further cause the electronic device to:
divide the block unit into a plurality of sub-block units;
determine a plurality of sub-block positions of the plurality of sub-block units;
derive one of the plurality of derived motion vectors for each of the plurality of sub-block units by applying a corresponding one of the plurality of sub-block positions to the motion linear model; and
reconstruct each of the sub-block units based on a corresponding one of the plurality of derived motion vectors to reconstruct the block unit.

17. The electronic device according to claim 10, wherein the one or more computer-executable instructions, when executed by the at least one of the one or more processors, further cause the electronic device to:
determine at least one of a plurality of control point (CP) positions of the block unit in the affine-based mode;
determine at least one CP motion vectors in the affine-based mode by applying the at least one of the plurality of CP positions to the motion linear model to generate at least one of a plurality of affine candidates; and
reconstruct the block unit based on the at least one of the plurality of affine candidates.

18. The electronic device according to claim 10, wherein:
a sum of a number of the plurality of neighboring sub-partitions and a number of the plurality of affine-coded sub-blocks for deriving the motion linear model is less than or equal to a quantity threshold.

* * * * *